United States Patent Office 2,953,711
Patented Sept. 20, 1960

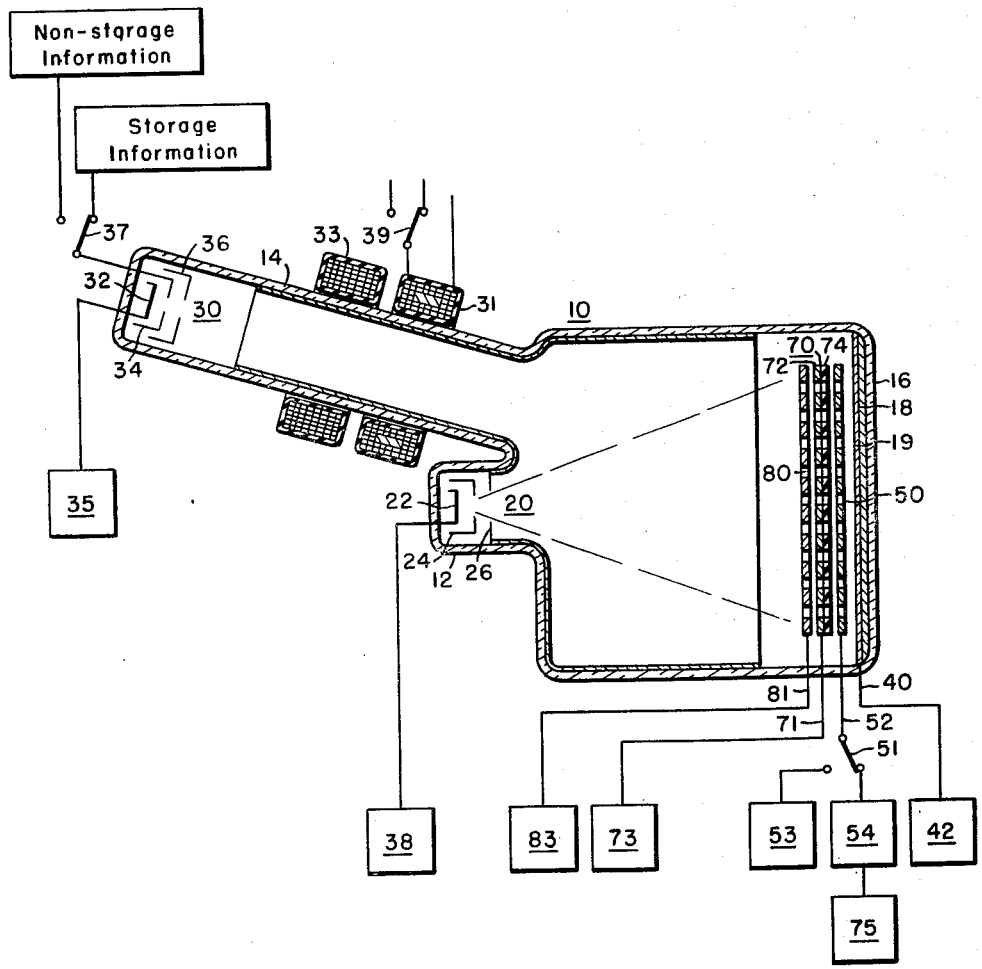

2,953,711

STORAGE DISPLAY SYSTEM

Morris J. Taubenslag and James C. Broderick, Baltimore, Md., assignors to Westinghouse Electric Corporation, East Pittsburgh, Pa., a corporation of Pennsylvania Filed Feb. 12, 1958, Ser. No. 714,830

5 Claims. (Cl. 315—12)

This invention relates to display systems and more particularly to those systems in which information may be introduced and then extracted at a later time. This invention is more particularly directed to a viewing type of storage tube in which the information extracted is displayed visually on the viewing face of the storage tube. Storage type cathode ray display tubes have been proposed and utilized in display systems such as television and radar in order to obtain brighter images and obtain greater signal to noise ratio.

In general, the viewing type storage tube consists of a foraminated storage grid member which controls the flow of electrons between a flooding type electron gun and a luminescent screen. A space distributed charge image is produced on the surface of the storage grid by modulating a scanning or writing electron beam of small area and the charge image or pattern recorded on the storage grid controls or modulates the flow of electrons from a flooding type reading gun to the screen and thus a visual light pattern or image corresponding to the charge pattern on the storage grid is produced on the display screen.

The charge pattern on the storage grid may be created by secondary electron emission from the surface of the storage grid. In most devices, the writing beam has only been able to change the charge on the surface of the storage grid in one direction. It is therefore normally necessary to erase or remove this information by changing the voltage between the cathode of the flooding gun and the storage grid before any new information may be displayed on the same area.

There are many applications where it is desirable to write a charge image on the storage grid to provide storage type display information which may be read out by the reading gun for a predetermined time interval to provide a light display on the screen and at the same time superimpose a line, a moving object of non-storage type information directly onto the viewing screen without disturbing the storage information on the storage grid. For example, in an airborne interceptor or bombing radar display system, there are usually two different types of information to be displayed. The radar information, consisting of range and azimuth, is displayed on a (B) scope. The frame rate of this presentation is slow, for example, of the order of two or more seconds, and therefore it has been advantageous to utilize storage techniques to improve the signal to noise ratio and display a uniform mapping of the radar search cone. This information may be referred to as radar or storage information. On the same indicator, it is also desirable to display symbols which represent the aircraft altitude and these symbols may be in the form of lines, circles, dots and crosses. These symbols are written at a fast rate of 400 cycles per second. This information should not be stored in that it would degrade the display since the movement of the symbols tends to blur and blot out radar or storage information. This information might be referred to as non-radar or non-storage information. It is, therefore, desirable to have a display tube which has two display time constants, one long for storage or radar information and the other short for non-storage or symbol indication.

It is accordingly an object of our invention to provide an improved display system in which storage type information may be displayed on a screen alternately with independent non-storage information to obtain simultaneous visual display.

It is another object to provide a cathode ray tube in which stored and non-stored information may be displayed simultaneously on a common viewing screen.

It is another object to provide an improved display system which includes a storage tube and in which storage type information may be stored on a storage grid and displayed on a screen for a predetermined time while sequentially interposing non-storage information on the display screen without disturbing the storage type information on the storage grid.

These and other objects are effected by our invention as will be apparent from the following description taken in accordance with the accompanying drawing.

Referring in detail to the drawing, there is shown a storage tube comprising an evacuated envelope 10 of suitable shape and configuration and of suitable material. Positioned at one end of the envelope are two neck portions 12 and 14 in which the electron gun structures are positioned. The centrally located neck portion 12 is provided with an electron gun structure 20 for generating a flooding beam while the other neck portion 14 is provided for the writing electron gun 30.

The writing electron gun 30 is comprised of at least a cathode 32, a control grid 34 and a beam forming and accelerating electrode 36. A suitable electrostatic or electromagnetic focusing system illustrated as an electromagnetic coil 33 is provided and is around the neck portion 14 of the tube for focusing the electron beam emitted from the writing gun. A suitable electrostatic or electromagnetic deflection system is provided and is illustrated as an electromagnetic coil 31 around the neck 14 for deflecting the electron beam to scan a raster over the entire surface of a target structure. Suitable voltages are applied to the electrodes of the writing gun 30 and the focusing and deflection coils 31 and 33 in order to provide proper focusing and deflection as is well known in the art. The cathode 32 of the writing gun 30 is connected by electrical conductive means to a suitable voltage source 35 of about 2000 volt negative potential with respect to ground. The control grid 34 is connected by conductive means to a switch 37. The switch 37 provides means of connecting non-storage or storage information to the control grid 34. It is also desirable to provide a switch 39 in the deflection yoke circuit to provide means of applying different deflection voltages depending on whether storage or non-storage information is being written at the time.

The flood gun 20 consists of at least a cathode 22, a control grid 24 and an anode 26 and produces a high current electron beam so as to flood the target structure with electrons substantially uniformly across the entire structure. The cathode 22 of the flood gun 20 is also connected by electrical conductive means to voltage source 38 of only a few volts, such as negative ten volts with respect to ground.

Positioned on the opposite end of the envelope 10 with respect to the electron guns is an end plate or viewing window 16 of a transparent material such as glass which also closes off the end of the envelope 10. There is provided on the interior surface of the transparent end plate 16 a coating 18 of suitable luminescent material. The coating 18 emits radiation normally in the visual region when bombarded by electrons of suitable energy. A suitable material for the coating 18 would be a phosphor material such as zinc sulfide which emits radiation in the visible region. An electron permeable coating 19 of electrical conductive material such as aluminum may be deposited on the exposed surface of the phosphor layer 18. An electrical conductive lead 40 is provided from the conductive coating 19 to the exterior of the envelope to provide means of applying a suitable potential to the phosphor screen. A potential source 42 supplies voltage to the phosphor screen of the order of 10 to 15 kilovolts to provide the necessary acceleration to the electrons to provide emission of light from the phosphor screen 18.

Positioned adjacent and parallel to the phosphor screen 18 is an apertured repeller grid 50 which may be in the form of a mesh of electrical conductive material. An electrical conductive lead in 52 is provided from the repeller grid 50 to the exterior of the envelope 10 to a switch 51 to provide means of applying a suitable potential to the repeller grid 50. The switch 51 provides means of connecting either a source 53 of a negative potential of about 2200 volts or a source 54 of about ground potential to the repeller grid 50. A positive pulse source 75 is provided for pulsing the repeller grid for erase operation.

Positioned adjacent and parallel to the repeller grid 50 and on the opposite side of the repeller grid 50 with respect to the screen 18 is an apertured storage grid member 70 which consists of a supporting back plate 72 which may be in the form of a fine wire mesh of electrical conductive material. On the surface of the conductive back plate 72 facing the phosphor screen 18 and adjacent to the repeller grid 50 is deposited a coating 74 of the dielectric material which has a very high specific resistivity such as magnesium fluoride. The coating 74 should also have secondary emissive properties as is well known in the art of storage tubes. The storage tube is more thoroughly discussed in a book entitled "Storage Tubes and Their Basic Principles," by M. Knoll and B. Kazan, and published by John Wiley and Sons, Inc., New York, 1952. The foraminated back plate 72 may be manufactured by any suitable method to obtain an apertured member and may be of a material such as copper or nickel. The storage grid 70 may also have the form of a self-supporting dielectric mesh of suitable resistivity and of secondary characteristics and coated with a conductive back plate layer. The storage grid 70 is also provided with electrical conducting means 71 to the exterior of the envelope and is connected to a positive voltage source 73 of about ten volts.

Positioned adjacent to and parallel to the storage grid 70 on the opposite side thereof with respect to the repeller grid 50 is a collector grid 80 which is normally in the form of a fine mesh of a suitable electrical conductive material. The collector grid 80 should have a comparable number of openings as the storage grid 70. A suitable lead-in conductive means 81 is also provided from the collector grid 80 to the exterior of the envelope 10 and connected to a suitable voltage source 83 of about 250 volts.

To explain the operation of the above-described system, the operation may be broken down into four phases— erase, write, read and write-through. If it is assumed that the write-gun is biased to cutoff and the flooding electron gun is connected to the source 38 of potential of about 10 volts negative with respect to ground, then electrons will be emitted from the flooding gun 20 and be accelerated by the collector grid 80 at a positive potential of about 250 volts through the storage grid 70 and be repelled by the repeller grid 50 into incidence with the insulating coating 74 on the storage grid 70. The repeller grid 50 would be connected to the source 54 which is ground potential. The source 75 provides a positive pulse to the repeller grid to effect this erase operation. The source is utilized only during this operation. The electrons will actually approach the storage grid surface 74 with energy of about 10 electron volts and strike the storage grid 70. Since an energy of 10 electron volts is below the first crossover potential of the insulating material 74 on the storage grid 70, the bombarded surface of the storage grid 70 will charge in negative direction to a potential of about 10 volts negative with respect to ground. The electrons from the flooding gun 20 will not pass through the storage grid 70 with a potential of the order of 10 volts on the insulating surface 74 of the grid 70.

In the second phase or write phase, the storage information is applied to the grid of the writing-gun 30 and the potential of the cathode 32 of the writing-gun 30 is about 2000 volts negative and the repeller grid is about 2200 volts negative. The electrons from gun 30 will be repelled and strike the insulator surface of the target with an energy between the first and second crossover potential of the insulating material on the storage grid 70 and the storage information will be impressed on the grid. A varying charge will be placed on the elements of the storage grid 70 in accordance with the storage information applied to the control grid 34 of the writing gun 30. The electron beam will be scanned over the grid 70 in accordance with storage deflection voltage applied to the deflection yoke. At a potential between first and second crossover, the primary electron beam has sufficient energy to remove more electrons from the insulator 74 than land on the insulator. The collector grid 80 operating at a positive potential of 250 volts collects the secondary electrons so that a net positive charge is left on the insulator surface of the storage grid 70. Since the insulator surface had been previously brought to a negative potential by the erase pulse cycle, such that the storage grid 70 tended to cut off the flow of flood gun electrons to the phosphor screen 18, this net positive charge pattern distributed over the insulator by the storage of storage signal lowers the biasing action of the grid 70.

The third phase or read phase of the operation deals with the time that the flood gun 20 is emitting electrons and thereby activating the phosphor screen in accordance with the charge image on the grid 70. The storage pattern written on the storage grid allows the electrons to pass through the storage grid 70 and repeller grid 50 to the screen 18. The repeller grid operates at about ground potential in this phase. The write-gun is biased off in this phase of operation.

The fourth or write-through phase provides means to write symbols on the screen which are not to be stored on the storage grid 70 and without affecting the information on the storage grid 70. This is accomplished in the following manner. The write-gun 30 is modulated with the non-storage information and the beam as it is deflected by means of non-storage deflection voltage across the grid 70 will pass through apertures in the storage grid 70 and strike the screen. The repeller grid operates near ground potential in this phase. During this write-through phase the flood gun 20 may or may not be on and after the "write-through" phase the operation may go to the read phase or erase phase depending on the operation of the device. It is thereby possible to simultaneously read and write through. It is also possible to time share between the read phase and the write-through phase, to display the non-storage and storage information sequentially and yet appear simultaneous to the human eye.

While we have shown our invention in only one form, it will be obvious to those skilled in the art that it is not so limited, but is susceptible of various other changes and modifications without departing from the spirit and scope thereof.

We claim as our invention:

1. A storage system for displaying two types of information on a display screen within a storage type display tube comprising a display screen, a storage grid, means for writing storage type information on said storage grid with an electron beam with an energy between the first and second crossover potential of said storage grid to store a given charge pattern thereon, means for directing a flooding type electron beam through said storage grid to said screen modulated with charge pattern on said storage grid of an energy below said first crossover potential in the region of said storage grid, said storage grid modulating said flooding electron beam in accordance with the charge pattern on said storage grid to display a visual image on said screen corresponding to said charge pattern and means for directing an electron beam modulated with non-storage type information through said storage grid to display non-storage information with said storage information on said display screen without modifying the charge pattern on said storage grid or being substantially affected by said charge pattern.

2. A storage display system comprising a foraminated electron storage grid having an electrically conductive layer and a layer of dielectric material, said foraminated dielectric layer exhibiting secondary electron emission when bombarded by electrons, a display screen disposed adjacent to and on the side of said storage grid facing said dielectric layer, said display screen emitting electromagnetic radiations in response to electron bombardment, means for forming a first electron beam consisting of electrons of a first energy in the region of said storage grid and directing the electron beam through the apertures in said foraminated storage grid and repelling the beam back onto said dielectric layer to write a charge pattern on said dielectric layer in response to storage type video information modulation applied to said electron beam, means for establishing a second electron beam positioned on the remote side of said storage grid with respect to said display screen to flood said storage grid with electrons of a second energy to pass through the apertures in said storage grid and be modulated in accordance with said charge pattern, means for accelerating the flooding electrons passed through said storage grid into incidence with said display screen and thereby produce a light pattern corresponding to said charge pattern, and means positioned on the same side of said storage grid as said second electron beam establishing means for directing a third electron beam of a third energy modulated with non-storage information through said storage grid to produce a light pattern representing non-storage information on said display screen.

3. In a storage display system comprising a storage tube, said storage tube comprised of an electron sensitive display screen, a storage member having a plurality of apertures therein positioned near said display screen, a repeller grid positioned between said storage member and said display screen, a collector grid positioned on the opposite side of said storage member with respect to said repeller grid, said storage member comprised of a conductive support layer having an insulating layer on the surface of said conductive layer facing said display screen, a flooding electron gun provided on the opposite side of said collector grid with respect to the storage member to provide an electron beam of a first energy for flooding the entire storage member, a pencil type electron beam also provided on the opposite side of the collector grid with respect to the storage member with deflection means for causing said electron beam to scan a raster over said storage member, circuit means for placing storage information on said pencil electron beam and directing said beam at a second energy through the apertures in said storage member, circuit means associated with said repeller grid to supply potential to said repeller grid to repel the electrons within said beam of second energy into incidence with said insulator surface of said storage member to write a charge pattern thereon corresponding to the storage information impressed on said electron beam, circuit means associated with said storage tube for causing said flooding type electron gun to project electrons through the apertures in said storage member into incidence with said display screen and modulated with the charge pattern on said storage member to display a light pattern corresponding to said charge pattern, circuit means associated with said storage tube for causing said pencil type electron beam to be modulated with non-storage information and projected through the apertures of said storage grid into incidence with said display screen, said non-storage modulated beam of higher intensity than said beam of second energy whereby the charge pattern of said storage grid is ineffective in modulating said non-storage beam.

4. In an electronic charge storage system, a perforated storage target having an electrically conductive side and a dielectric side, an electron sensitive screen positioned on the dielectric side of said target, means for establishing uniform charge potential on said dielectric surface, means for producing an electron beam modulated with storage information for scanning the conductive side of said storage target, a repeller grid provided on the opposite side of said target with respect to said electron beam producing means to deflect the electrons in said electron beam passing through the apertures in said storage target into incidence with said dielectric layer to produce a charge pattern thereon, means effective after said storage information is provided on said storage grid by said storage modulated electron beam to modify the potential on said repeller grid to permit passage of electrons from said storage grid to said electron sensitive screen, means for modulating an electron beam with non-storage information and means for deflecting said beam to scan a raster on said screen and simultaneously modulating a low intensity beam with the charge pattern produced on said storage grid to produce a light pattern on said screen corresponding to said charge pattern.

5. A storage display system comprising a storage tube having a foraminated storage member, said storage member comprising a foraminated layer of conductive material and a layer of foraminated insulating material, said insulating material exhibiting the property of secondary emission when bombarded by electrons, a display screen positioned adjacent to one side of said storage member, means for generating a first electron beam for scanning the surface of said insulating layer to write a charge pattern thereon corresponding to storage information applied to said electron beam, means for generating a reading beam of a second energy and directing said beam through said storage member to said screen, said second beam modulated with the charge pattern deposited on said storage member by said first electron beam, means for generating a third electron beam modulated with non-storage type information and of such an energy as to pass through the apertures in said storage member to strike said screen member without modifying the charge pattern on said storage member or being substantially affected by the charge pattern on said storage member.

References Cited in the file of this patent
UNITED STATES PATENTS

| | | |
|---|---|---|
| 2,661,442 | Buckbee | Dec. 1, 1953 |
| 2,687,492 | Szegho et al. | Aug. 24, 1954 |
| 2,730,640 | Koller | Jan. 10, 1956 |
| 2,790,929 | Herman et al. | Apr. 30, 1957 |
| 2,806,174 | Pensak | Sept. 10, 1957 |
| 2,818,524 | Smith | Dec. 31, 1957 |
| 2,843,798 | Hook | July 15, 1958 |